United States Patent [19]

Guess

[11] Patent Number: 5,389,262

[45] Date of Patent: * Feb. 14, 1995

[54] PROCESS FOR REMOVING HEAVY METALS FROM SOLUTIONS WITH FERROUS DITHIONITE AND HYDROXIDE

[75] Inventor: Robert G. Guess, Beverly, Mass.

[73] Assignee: Romar Technologies, Inc., Danvers, Mass.

[*] Notice: The portion of the term of this patent subsequent to Jun. 16, 2009 has been disclaimed.

[21] Appl. No.: 218,733

[22] Filed: Mar. 28, 1994

Related U.S. Application Data

[63] Continuation-in-part of Ser. No. 893,978, Jun. 3, 1992, Pat. No. 5,298,168, which is a continuation-in-part of Ser. No. 682,129, Apr. 8, 1991, Pat. No. 5,122,279.

[51] Int. Cl.$^6$ ................................. C02F 1/62
[52] U.S. Cl. ......................... 210/719; 210/717; 210/720; 210/724; 210/726; 210/912; 210/913; 210/914; 75/712; 75/714; 75/739
[58] Field of Search ................. 210/912–914, 210/719, 720, 724, 717, 726; 423/515; 75/712, 714, 715, 739, 740, 741

[56] References Cited

U.S. PATENT DOCUMENTS

| | | | |
|---|---|---|---|
| 4,405,464 | 9/1983 | Baldwin et al. | 210/717 |
| 4,956,097 | 9/1990 | Courduvelis | 210/718 |
| 5,011,610 | 4/1991 | Martin et al. | 210/667 |
| 5,019,273 | 5/1991 | Fehsenfeld et al. | 210/719 |
| 5,085,836 | 2/1992 | Booker | 210/719 |
| 5,122,279 | 6/1992 | Guess | 210/717 |
| 5,133,873 | 7/1992 | Catlin et al. | 210/715 |
| 5,298,168 | 3/1994 | Guess | 210/713 |

FOREIGN PATENT DOCUMENTS 1305703  4/1974  United Kingdom.

*Primary Examiner*—Neil McCarthy
*Attorney, Agent, or Firm*—Paul J. Cook

[57] ABSTRACT

Heavy metal ions react with ferrous dithionite in acidic aqueous solution. They are reduced to metallic particles that are suitable for recycling and reuse when recovered from the acidic water. Chelating agents that are present are deactivated by bonding to the ferrous ions. Ferrous dithionite, ($FeS_2O_4$) is either generated in-situ or ferrous ions and dithionite ions can be provided by other methods. An alkali metal hydroxide is utilized to precipitate remaining heavy metal ions including ferrous and ferric ions.

21 Claims, No Drawings

PROCESS FOR REMOVING HEAVY METALS FROM SOLUTIONS WITH FERROUS DITHIONITE AND HYDROXIDE

REFERENCE TO RELATED APPLICATIONS

This application is a continuation-in-part of application Ser. No. 07/893,978, filed Jun. 3, 1992, now U.S. Pat. 5,298,168 which, in turn, is a continuation-in-part of application Ser. No. 682,129, filed Apr. 8, 1991, now U.S. Pat. 5,122,279.

BACKGROUND OF THE INVENTION

This invention relates to a process for effectively and completely removing heavy metals from aqueous solutions with hydrosulfite and iron. The present invention is useful for treating metal ion containing waste water generated by industries such as metal plating, metal surface finishing or printed circuit manufacturing.

Prior to the present invention, methods for producing ferrous dithionite (iron hydrosulfite) have been explored as a possible new way to make sodium hydrosulfite. Sodium hydrosulfite is manufactured by several methods and several hundred million pounds per year are used worldwide each year. It is mainly used for, 1) bleaching woodpulp for newsprint, 2) reducing textile vat dyes, and 3) reductive leaching of ferric oxide from kaolin clays. All these major uses for hydrosulfite are for whitening or enhancing the color stability of materials to which it is applied. Most iron compounds are black or dark colored, thus discouraging the use of iron hydrosulfite for any of these major applications of sodium hydrosulfite.

U.S. Pat. No. 4,076,791 discloses improvements in making iron hydrosulfite and converting it to sodium hydrosulfite. More than 90% of the iron must be removed and replaced by sodium in order to use the resulting solution for leaching kaolin. A large volume of iron precipitate is produced which absorbs and wastes a large portion of the hydrosulfite, causing this process to be uneconomical. Prior to the present invention, with the exception of applicant's prior U.S. Pat. No. 5,122,279, no commercial use for iron hydrosulfite had been developed and efforts to develop iron chemistry in connection with hydrosulfite were abandoned.

Ferrous sulfate has been used to stabilize a sodium dithionite solution. In Japanese Patent JP 54029897, a 2% solution of sodium dithionite was used to decolorize dyeing wastewater containing Prussian Brilliant Red H3B [23211-47-4]. Adding some ferrous sulfate to the dithionite solution improves the stability of the decolored wastewater solution. There is no mention of any interaction or involvement by heavy metals existing in this prior work relating ferrous ion to dithionite ion.

Metallic iron has long been known to react directly with certain other metals that are dissolved in acidic aqueous solutions. The iron dissolved into the acidic solution and the other dissolved metal deposits a metallic layer on the surface of the iron. Referred to as metallic replacement or cementation, this characteristic of metals has commonly been used in the commercial extraction of copper from ores and acid leaching of mine tailings. After some time, the surface of the iron is so covered with the other metal that the iron becomes unreactive and the reaction ceases.

U.S. Pat. No. 3,902,896 addresses this limitation and discloses the use of a soluble thiosulfate compound to aid the cementation of such metals as copper, silver, gold and platinum group metals from aqueous solutions. The patent discloses that the cemented metal flakes off the base metal, exposing fresh surfaces. Two properties of thiosulfate limit its utility for this purpose. In strong acid solutions, thiosulfate decomposes to sulfur dioxide and elemental sulfur, which is colloidal and coats all surfaces it contacts. Also, dilute thiosulfate solutions are very corrosive on ferrous alloys, particularly on stainless steel materials.

U.S. Pat. No. 3,634,071 describes the use of sulfur dioxide for reducing ferric ions contained in recirculated ore leaching acid solutions. Some improvements in the cementation of copper using metallic iron were observed as relating to decreased oxidation of the iron and copper metals by ferric ions. No reference is made to dithionite. At the high sulfuric acid concentrations noted, it is very unlikely that dithionite ion could exist.

U.K. Patent Application GB 125828 A, filed Jun. 16, 1983 discloses a process for removing copper ion from solution by contacting the solution with steel wool, converting only a small portion of the iron into copper. This process is commercially undesirable due to 1) the uneconomically low conversion of iron to copper, and 2) handling the materials. The recovered copper has a lower recycling value due to the cost of processing required for separating it from the residual steel wool fibers.

Many other methods exist for removing heavy metal ions from aqueous solutions, and which are commonly practiced in the pretreatment of industrial wastewaters containing environmentally toxic metals. When dissolved heavy metal solutions are free of chelating agents, they can be effectively treated by simply admixing an alkaline or caustic compound to precipitate the insoluble metal hydroxide. Sodium hydroxide, soda ash, lime or magnesium hydroxide slurry are all used to do this.

Frequently, however, complexing ammonium ions of chelating compounds such as the sodium salts of etheylenediaminetetra-acetic acid (E.D.T.A.) and others having similar properties are present. They occur as ingredients in the used plating baths, cleaners and brighteners drained into the wastewater. In such cases, it is necessary either; 1) to use a strong chemical that breaks the chelant-to-heavy metal bond and forms a stable, insoluble compound or complex of the toxic metals, or 2) to add a chelant than does the toxic metal ion, to free the heavy metal to precipitate as an insoluble hydroxide. Processes of both types are currently practiced.

Sodium sulfide is used to effectively precipitate heavy metals. Its sole advantage is the extremely low solubility of most heavy metal sulfides. Most are capable of existing in the presence of even the strongest chelating agents. Also, metal sulfide precipitates are slimy and difficult to filter. Large quantities of flocculants and filter aids are used, generating large volumes of sludge and corresponding high disposal costs.

Sodium borohydride is a strong, water soluble reducing agent that has an advantage of producing a compact semi-metallic sludge. There are several reasons for its not having broad acceptance for heavy metal removal in waste-water treatment: 1) it is very expensive, 2) precipitated metals easily reoxidize and redissolve in the presence of dissolved ammonia, 3) dangerous concentrations of potentially explosive hydrogen gas can accumulate in the space above a reaction using sodium borohydride, and 4) at times when pH is not controlled perfectly, reactions occurring at an elevated pH of 8 or higher give off toxic fumes of hydrogen sulfide gas, dangerous to workers and sensitive equipment.

Hydrazine is another strong reducing chemical capable of breaking a metal ion bond to chelants. It is used to a limited extent for heavy metal removal, but like borohydride, lacks widespread acceptance. Partly because it too is very expensive to use, and it too can generate dangerous volumes of hydrogen gas when acidified, hydrazine has also been placed on a list of chemicals suspected of being carcinogenic. This has been a major impediment to its industrial use.

Several compounds have been used that form insoluble metal complexes with heavy metal ions. All exert a stronger attraction to the metal ion than the chelants normally occurring with the metals in the wastewaters. Insoluble starch xanthate is one such material, reportedly effective at complete removal of dissolved metal from the water. Its drawback is its generation of huge volumes of sludge, which retains a high water content and costs the user a severe penalty for disposing of same as a hazardous waste.

Another such complexing agent has gained widespread use. Known in the water treatment trade as D.T.C., or as dimethyl- dithiocarbamate, it is fairly effective at completely removing the heavy metal ions from solution. However, D.T.C., is quite expensive and generates quite high volumes of sludges which are unusable for current recycling methods. The precipitate is light in density and difficult to gravity settle, and it also gives off a foul smelling odor.

The conventional wastewater treatment process, perhaps most frequently used by the largest number of industries, uses ferrous sulfate heptahydrate powder. Ferrous ion is substituted at a controlled acidic pH of about 2 to 3, to replace toxic heavy metal ions that are bonded by chelating agents. This allows the heavy metal ions to be rendered insoluble as hydroxides which are precipitated from an alkaline solution.

In the presence of strong chelants or free ammonia dissolved in alkaline solutions, a large excess of this source of ferrous ion is required. Normally, 5 to 10 ferrous ions are added for each copper ion being removed from chelated waste-waters. In heavily chelated streams, as many as 25 to 30 ferrous ions per heavy metal ion may be required in order to prevent the chelants from dissolving the heavy metal hydroxide. The commercial ferrous sulfate has seven waters of hydration and is only about 20% iron by weight. In some cases, over 100 pounds of ferrous sulfate powder is added to the wastewater for each pound of chelated or ammoniated copper removed generating 60 to 80 pounds of sludge.

In typical treatment systems, each additional pound of iron used adds about 4 pounds to the weight of sludge made. This can be reduced to about 3 pounds of dry sludge per pound of iron if a sludge dryer is used. When ferrous sulfate is dissolved into wastewater, it causes acidity in the water. Each mole of iron introduced this way requires using two moles of sodium hydroxide to neutralize the iron and form ferrous hydroxide. Therefore, when large excess amounts of ferrous sulfate heptahydrate powder are used, the total chemical cost for treatment is compounded. Higher hazardous waste sludge disposal costs are also incurred.

Sodium hydrosulfite is a strong, water soluble reducing agent. It can reduce heavy metal ions to zero valance and produce a metallic precipitate that is resistant to reoxidation. Commercial products are available as either a 13-14% buffered solution or as 85-95% powder. However, sodium hydrosulfite solutions are quite unstable and have a very short shelf life. Storage tanks need to be refrigerated and inert gas blanketed. The powdered products have an acrid odor and a dust that is extremely irritating to a worker's eyes and nose. Damp or wet powder can spontaneously ignite into flames, creating a toxic smoke of sulfur dioxide. These objectionable properties have prevented sodium hydrosulfite products from gaining any major share of usage for heavy metal removal or for wastewaters treatment in general.

While the process described in U.S. Pat. No. 5,122,279 is extremely effective in removing heavy metals from aqueous solutions containing heavy metals, the use of ferrous dithionite is relatively more expensive than the use of an alkali metal hydroxide which is currently used to form a metal hydroxide sludge which is further treated to recover heavy metals or safely stored in approved storage areas. In contrast, the use of ferrous dithionite provides the substantial advantage that it effects a process which minimizes or eliminates the need to store sludge since relatively innocuous ferric ions can be safely removed from the treatment process with treated waste-water. However, in some instances, it may be desirable also to substantially eliminate ferrous and ferric ion from wastewater.

It would be highly desirable to provide a simple, non-hazardous process for removing heavy metals from aqueous solutions that would;

1) use non-hazardous materials in a safe and simple method that does not give off foul odors or toxic or explosive gases or irritating dust, and,
2) achieve very low levels of residual toxic heavy metal ions resulting in environmentally compliant wastewater for discharge to the sewer, and,
3) minimize hazardous waste sludges requiring regulated transport and expensive disposal, and,
4) produce dense, fast settling or easily filterable solids with high metal concentrations suitable for recycling and reuse of the metals.
5) substantially eliminate ferrous and/or ferric ions from waste water.

SUMMARY OF THE INVENTION

In accordance with the present invention, ferrous dithionite is reacted with chelated heavy metal ions in acidic water in a novel process which requires and uses both ferrous and dithionite ions as well as an alkali metal hydroxide. The dithionite ions reduce the heavy metal ions to zero valence in the presence of ferrous ions. The ferrous ions bind to the chelant compound replacing the heavy metal ions previously bonded, in the presence of dithionite ions. The reducible heavy metals form metallic particles that are suitable for economical recycling and reuse. The concentration of ferrous and dithionite ions is sufficient to effect precipitation of between about 30% and 90% of the heavy metal ions in solution in a first step. The remainder of the heavy metals in solution including ferrous and ferric ions are removed by precipitation with an alkali metal hydroxide. The heavy metallic particles are recovered by gravity settling or filtering from the acidic solution. The remaining heavy metal ions including ferrous and ferric ions are recovered as hydroxides by precipitation. The heavy metals and heavy metal hydroxides (including ferrous and ferric hydroxides) are recovered as a mixture.

Ferrous dithionite is preferably generated in-situ by a reaction between metallic iron particles and bisulfite ions in the acidic heavy metal solution. The same resulting composition and beneficial effects can be obtained by several routes or alternative materials. Adding both a soluble dithionite compound and a soluble ferrous compound, either separately or in a combined form, into the acidic solution of heavy metals can achieve the desirable result. This result in combination with the use of an alkali metal hydroxide to precipitate ferrous and ferric ions as well as residual heavy metal ions comprise the process of this invention.

Such other sources of dithionite and ferrous ions can include, for example, sodium hydrosulfite and ferrous sulfate. When combined together in the presence of dissolved heavy metal ions in an acidic aqueous solution, dithionite and ferrous ions are equally useful in precipitating heavy metals, whether generated in-situ or each is added to the reaction from separate origins.

DESCRIPTION OF SPECIFIC EMBODIMENTS

In accordance with the method of this invention, ferrous dithionite is utilized to precipitate heavy metals from aqueous solutions. In a preferred method, iron particles and a bisulfite compound or suitable bisulfite precursor are admixed with a slightly acidic aqueous solution containing dissolved heavy metal ions. The metallic iron reacts with the bisulfite ions, producing ferrous dithionite in the presence of the heavy metal ions and in accordance with Equation 1.

$$Fe + 2(HSO_3)^- + 2H^+ \rightarrow (Fe)^{++} + (S_2O_4)^= + 2H_2O \quad \text{(Equation 1)}$$

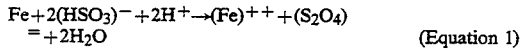

Under the slightly acidic condition provide, the dithionite ions react instantly with and reduce the heavy metal ions present to zero valence metallic particles. The dithionite ions are thus oxidized and become regenerated as reactive bisulfite ions, as shown by Equation 2.

$$(S_2O_4)^= + (HM)^{++} + 2H_2O \rightarrow (HM)^\circ + 2H^+ + (2HSO_3)^- \quad \text{(Equation 2)}$$

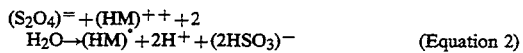

Therefore as shown by Equations 1 and 2 wherein HM is a heavy metal, this reaction is self regenerating in the bisulfite ion when the reactions are performed simultaneously and in-situ. This method provides a very efficient utilization of the bisulfite ion or its suitable precursor. The bisulfite-dithionite redox cycle promotes the indirect reducing reaction between the metallic iron and the heavy metal ions.

When chelating agents are present in the aqueous solutions being treated the ferrous ions produced in Equation 1 also are beneficially utilized by bonding to chelating agents $[CA^=]$ which were previously bound to heavy metal ions. This reaction is defined by Equation 3 as follows:

$$(Fe)^{++} + [CA^=]^*(HM)^{++} \rightarrow HM^{++} + [CA^=]^*(Fe^{++})$$

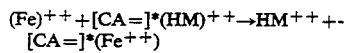

The reaction defined by Equations 1, 2 and 3 are effected at a pH between about 1 and 7, preferably between about 3 and 6. A practical trade off between faster reactions at lower pH values is required which may result in varying choices from solution to solution being treated. The upper pH limit may also be governed by the tendency to form insoluble metal hydroxides at pH values approaching neutral between 5 and 7. The higher the concentration of dissolved metals, the lower the pH at which the insoluble hydroxides begin appearing.

Metal ions generally have a more positive oxidation potential when bonded to a chelate complex. Upon being dissociated from the chelant complexes by the ferrous ion, the heavy metal ions have a more negative oxidation potential and are therefore more reactive with and more readily reduced by the dithionite ion. This mutual and beneficial interaction between the ferrous ion, the chelated heavy metal ions, and the dithionite ion is important. The concentration of ferrous and dithionite ion utilized is sufficient to precipitate between about 30 and 90 wt %, preferably between about 80 and 90 of the dissolved heavy metals as metals. The remainder of the heavy metals as well as ferrous and ferric ions are precipitated as hydroxides so that a mixture of heavy metals and metal hydroxides is recovered. By utilizing this process, a convenient method is provided for precipitating heavy metals including ferrous and ferric ions economically.

The slightly acidic liquid obtained after precipitation of heavy metal particles including ferrous and ferric ions is neutralized using a caustic compound to a pH in the range of 9 to 12. This precipitates the insoluble hydroxides of all remaining dissolved and unreduced heavy metals. The excess dissolved iron that is not bonded to chelants co-precipitates with the other metals as ferrous hydroxide. While this recovery step can be advantageous, it is not essential to the process of this invention.

These reactions are shown by Equation 4 and Equation 5, respectively.

$$(HM)^{++} + 2(OH)^- \rightarrow HM(OH)_2 \quad \text{(Equation 4)}$$

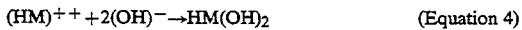

$$(Fe)^{++} + 2(OH)^- \rightarrow Fe(OH)_2 \quad \text{(Equation 5)}$$

In accordance with the process of this invention, ferrous dithionite is utilized to reduce heavy metal ions to metallic particles of said heavy metals. By the term "heavy metal" as used herein, is meant a metal having:

1) an atomic weight heavier than calcium, that is greater than 40.08, and
2) its compounds exhibit biological toxicity when released into the environment.

Representative heavy metals include copper, zinc, nickel, tin, lead, cadmium, mercury, chromium, zinc, manganese, silver, gold, platinum, palladium and mixtures thereof.

It is to be understood that the process of this invention using ferrous dithionite for removing heavy metals from water can be utilized regardless of the source or form of the ferrous dithionite, or bisulfite used to react with the metallic iron particles, and regardless of the source or form of the metallic ion on particles used.

For example, a solution of acidic sodium or potassium bisulfite can be made up by dissolving in water to a desired concentration, sodium or potassium metabisulfite. Likewise, sodium hydroxide or potassium hydroxide solutions could be treated with liquid or gaseous sulfur dioxide to produce a usable solution of alkali metal bisulfite. Any or all of these ingredients can be added separately or in combination directly into the heavy metal containing aqueous solution into which the metallic iron is directly added.

In another method, a ferrous dithionite solution consists of ferrous ions and dithionite ions, each provided from sodium hydrosulfite and the ferrous ions can be provided from ferrous sulfate. When both such materials are added, either combined or separately, to an acidic heavy metal solution, the desired results of the process of this invention occurs.

Similarly, when bisulfite ions are exposed to the reducing influence of sodium borohydride under certain conditions, dithionite ions are produced. When such dithionite ions are admixed with ferrous ions from any source and then such materials as result are admixed with heavy metal ions in acidic aqueous solution, the process of this invention is obtained.

Alternately, when metallic zinc is contacted with an aqueous solution containing dissolved bisulfite ions, such as occurs when sulfur dioxide is dissolved in water, dithionite ions are produced. When such dithionite ions are produced in the presence of heavy metal ions in aqueous solution or added into such a solution containing both heavy metal and ferrous ions, the process of this invention is obtained.

While the size of the iron particles is not critical to the present invention, it is desirable to use particles of a size between about −50 mesh and +300 mesh, preferably between about −100 mesh and +200 mesh. Generally, the molar ratio of sulfite to iron is between about 0.1 and 10.0, and preferably between about 0.5 and 4.0 for each mole of iron.

When this composition is added to an adequate volume of sufficiently acidic water, bisulfite ion is formed from the sulfite ion by Equation 6;

(SO$_3$)$^=$ + H$^+$ + → (HSO$_3$)$^-$       (Equation 6)

and ferrous dithionite is made therefrom to substantially or completely react the iron particles in accordance with Equation 1.

When the alkali metal in the sulfite is either sodium or potassium, a nominal excess of sulfite can be desirable to achieve optimum results. The optimum pH of a final reaction mixture will depend upon the intended use for the ferrous dithionite so generated. When dissolved heavy metals are present to be reduced by the dithionite, the reaction pH, should be controlled within a range of about I to 7, preferably between about 3 and 6.

One particularly preferable method of this invention comprises feeding an excess of iron particles into a vigorously agitated reactor. A slurry density of suspended metallic iron as high as 100 grams per liter of higher can be produced to provide expansive reactive surface area to the solution, and increasing the rates at which the iron dissolving reactions occur. The bisulfite reagent or suitable precursor is fed at a fixed ratio to the quantity of dissolved heavy metal contained in the feeding aqueous solution. As either the flow or the concentration of dissolved heavy metals may increase or decrease, the feed rate of bisulfite component is varied proportionately, The process of this invention produces only a small fraction of the amount of metal hydroxide, hazardous waste sludge as compared to existing wastewater treatment technologies, particularly when compared against the conventional method for using ferrous sulfate, which requires dissolving up to 25 times as much iron as does this process. The process of this invention substantially reduces the required concentration of ferrous ions to attain effective heavy metal removal from aqueous solutions. Conventional prior art methods of either settling or filtering or both are usable for removing the metal hydroxide sludge from the final wastewater effluent produced by the process of this invention.

Subsequent to precipitating 30 to 90 wt.% of the heavy metal in solution with ferrous and dithionite ions, the remaining solution is mixed with a metal hydroxide such as sodium hydroxide, potassium hydroxide, lithium hydroxide, magnesium hydroxide, or the like or mixtures thereof to increase the solution pH to above about 7, preferably between about 9 and 10 in order to precipitate the remaining heavy metal as well as ferrous and ferric ions in the form of hydroxides. The mixture of metal hydroxide and heavy metals then is recovered such as by filtration or the like.

The following examples illustrate the present invention and are not intended to limit the same.

EXAMPLE I

In the first test, the feed solution was pumped through the steel wool with no further changes made (without bisulfite). The outflowing liquid was collected and accumulated in a 5 gallon container. Over the period of the test, some removal of copper was visually evident, as the appearance of the entire steel wool mass gradually turned from shiny steel color to copper colored fibers. At the end of the test, the copper content of the 10 liters of collected effluent liquid was tested by atomic absorption (AA) spectrophotometry and contained 72.0 Mg/L copper. This indicates that 28% of the copper in the feed was collected on the steel wool, and shows that less than 25 percent of the iron was used beneficially.

EXAMPLE II

In another test, 3.00 grams of sodium metabisulfite (Na$_2$S$_2$O$_5$) were added and dissolved into 10 liters of the prepared copper feed solution of Example I. This modified feed solution was then fed at 200 mls per hour through a new steel wool bed made the same way as in Example I. Within a few minutes after starting the feed, a difference was observed on the appearance of the steel wool compared to the first experiment. Only the feed end portion of the steel wool bed, approximately the first ¼ cm, showed any color effect of copper. As the run proceeded, it was evident that rather than copper covered fibers of steel wool as obtained in the first test, a compact layer of copper particles was forming and being held together by the tightly packed steel wool fibers behaving as a filter. The short length of the coloration zone revealed that an extremely fast reaction rate was being observed. After about 2 hours of operating this test, the effluent from the bed was spot sampled and AA tested for copper, finding only 0.02 Mg/L Cu in the effluent. This same result was repeated after 10 hours, 20 hours, and 30 hours of run time. At 40 hours, the effluent spot sample contained 13 Mg/L of copper and only about ½ cm of steel wool remained. The copper solids were packed up against this plug of steel wool in a mass occupying only about 0.4 cm of length. The bottom 3 cm of the tube was void of solids and contained entering feed solution only. The run was continued to the end of the 10 liters of feed, at which time there was no evidence of fibrous material left from the steel wool. There also was no magnetically responsive material in the solids remaining in the tube. A compact slug of copper solids about 0.5 cm long was left, held in position by the cotton plug used to hold the steel wool in the end of the tube. After the run was completed, the 10 liters of effluent solution was stirred and sampled and analyzed, indicting 11.1 Mg/L of dissolved copper. A rise of about 1 unit was detected in the pH of this solution, measured at 4.9 versus 4.0 for the feed.

EXAMPLE III

Another test was performed by feeding a bisulfite solution is the absence of copper, prepared by dissolving 3 grams of sodium metabisulfite in water and diluting to 100 mls volume and adjusting its pH to 4. This solution was fed in about 30 minutes at 200 mls per hour through a new steel wool column made the same as in the prior tests. The effluent of the bed was directed into a 10 liter quantity of the prepared copper containing solution of Example I, with gentle stirring applied. About fifteen minutes after starting, a change in the copper solution was noted, changing to a greener color. The darkening continued until about near the end of the run, at which point the solution had turned almost black and showed evidence of particulate solids being formed in suspension. By the end of the 30 minute feeding cycle, discrete copper colored solid particles had formed in the 10 liters of liquid being treated. A further 100 ml of flushing water was passed through the remaining bed materials and into the mixing solution. By the end of that time, about another half hour, dense particles of copper were visible in the stirring 10 liters of liquid. After settling for one hour, a sample of supernatant liquid put through a p5 Fisher filter paper was tested and found to contain 38 Mg/L of dissolved copper. The remaining steel wool fibers occupied only about $\frac{1}{3}$ of the tubular space and had nearly lost the fibrous shape, becoming more a mass of fine black particles. Upon removing the remaining iron solids from the glass tube, rapid air oxidation took place, generating exothermic heat and rapidly forming rust-like material. This example shows that by contacting the bisulfite with iron prior to contacting copper produced a product capable of precipitation.

EXAMPLE IV

The procedure followed in making up the bisulfite containing copper solution fed to the test Example II above was conducted except in the absence of iron. An equal amount of bisulfite as used in the Example III test above was added into a 10 liter sample of the prepared copper containing solution. Other than a slight darkening of color toward a blue greenish tint, no visible reaction or other change occurred. No solids were formed and no removal of copper was effected by combining the bisulfite and dissolved copper in the same solution in the absence of metallic iron particles.

EXAMPLE V

This test was conducted to determine the influence exerted by chelating agents and ammonium ions in the feed solution. A new copper solution was made up from several source solutions obtained from printed circuit processes. This test solution contained portions of ammoniacal etchant bath, cupric chloride etchant bath, electroless copper plating bath, sulfuric acid /hydrogen peroxide etching bath, sodium persulfate etching bath, and copper sulfate electroplating bath in the approximate proportions that are typical of wastes disposed into a printed circuit plant wastewater system. The final mixed solution was diluted to 200 Mg/L copper and adjusted to pH 3. One liter of the solution was pH adjusted to 9.0 by adding sodium hydroxide with vigorous mixing. Copper hydroxide solids were precipitated and after 15 minutes of mixing, a drop of commercial anionic polymer was added to flocculate the precipitated solids. After settling 15 minutes, a liquid sample was withdrawn and put through a Fisher P5 filter paper and analyzed for dissolved copper. A concentration of 136 Mg/L dissolved copper indicated that 68% of the copper in the feed was effectively chelated or complexed.

The next four experiments were performed using atomized iron powder having particle sizes in the nominal range between −100 mesh and +300 mesh, and having a purity of greater than 99 percent iron, (Examples VI through IX).

EXAMPLE VI

This test was designed to measure the efficiency of removing copper from heavily chelated solutions using the simple cementation reaction with iron particles in the absence of bisulfite or dithionite. One liter of solution of Example V was placed in a beaker and provided with an overhead mixer. An equimolar quantity of iron particles weighing 0.176 grams was added to the solution and mixed for 1 hour. During that time, a coating of deposited metallic copper could be observed forming on the surface of the iron particles. After mixing for the 1 hour period, a sample was withdrawn and filtered and analyzed, indicating that 174 Mg/L or 87% of copper was still dissolved. After mixing for a second hour, another filtered sample indicated 170 mg/L of copper still in the solution, thus completing this experiment. This result indicated an uneconomically low efficiency of about 15 percent for the conversion of surface iron to copper by cementation in what is also an impractical slow reaction.

EXAMPLE VII

This experiment was carried out using another one liter sample of the subject feed solution of Example V. A 1.0 gram amount of sodium metabisulfite was added with vigorous mixing until dissolving was complete, then 0.176 gram of iron powder was added. After about 2–3 minutes, a visually different result was observed happening from that of Example VI. The suspended iron particles more nearly retained their grey-to-black color and tiny particles of copper/reddish material turned the solution to a copper-like color. After 15 minutes of mixing, a sample was withdrawn and filtered and analyzed. A dissolved copper content of 22 Mg/L was measured on the 15 minute sample, indicating 89% removal of copper from the solution

EXAMPLE VIII

In a further experiment of the method of example VII, all conditions were kept the same except that twice as much iron powder was added. After 15 minutes of mixing, a 10 ml sample was withdrawn and filtered and analyzed, obtaining a result of 0.05 Mg/liter of dissolved copper. A pH of 4.8 was measured on the reacted solution. A magnet was placed against the bottom of the beaker and then moved up the side of the glass attracting the unreacted iron particles which were observed to be black and not coated with a layer of deposited copper.

EXAMPLE IX

In this experiment, the resulting beaker of the experiment of Example VIII was settled for 15 minutes and the liquid portion was decanted off, leaving the solids in the bottom covered with a few milliliters of liquid. A new one liter portion of the subject feed solution was added to these contents and instantly, a new portion of 1 gram of sodium metabisulfite was added and dissolved with vigorous mixing. After mixing 15 minutes, a sample was filtered and analyzed, finding 39.2 Mg/L dissolved copper remaining in solution. No magnetic iron was found remaining in the copper colored metallic solids. The total copper removed in the two reactions by the one charge of 0.352 grams of iron is 360.65 milligrams, which calculates as an efficiency in the use of the iron at 90.16 percent.

EXAMPLE X

A one liter sample of strongly acidic spent ammonium persulfate etchant containing 20.3 grams/liter of copper was neutralized with 110 mls of 50% sodium hydroxide to a 4.7 pH. An aliquot of 100 mls of aqueous solution containing 9.8 grams of dissolved sulfur dioxide was added, dropping to a 1.7 pH. With vigorous mixing, 20.3 grams of iron powder was added. A very rapid reaction producing large, fast settling copper metal particles in about four minutes was observed. Mixing was discontinued at 10 minutes of reaction time. After one minute of settling, a sample was drawn, filtered, and tested by Atomic Absorption Spectrophotometry (AA). It gave 0.33 Mg/liter in copper concentration. After vacuum filtering and water rinsing, the recovered solids were air dried for two weeks. A net weight of 23.83 grams of coppery colored dry solids containing the 20.3 grams of copper were obtained.

Example XI

A batch reaction was conducted on 1000 gallons of copper etching and chrome plating bath and rinsewater mixture, which also contained dissolved ammonia in the amount of about 20-30 Mg/L. Heavy metals were contained in this solution in the amounts of copper at 100 Mg/L and hexavalent chromium at 15 Mg/L and zinc at 5 Mg/L and nickel at 4 Mg/L. The pH of the solution was adjusted to 1.7 by adding a small unmeasured amount of sulfuric acid. One (1.0) kilogram of sodium sulfite powder was added into the reactor with the mixer on, dissolving into the solution and resulting in a slight pH rise to about 1.9 to 2.0. Measurements of oxidation-reduction potential (ORP) indicated about +325 mv before adding the sulfite and about +290 after the added sulfite dissolved. One-half (0.500) kilogram of iron powder was poured into the reactor. ORP measurement showed an immediate and fast reaction taking place, indicated by a rising pH and less positive ORP millivolt readings. After only about twenty minutes, the ORP was leveled out at about −300 mv and the pH had risen to about 3. Sodium hydroxide was then added to raise the pH of the entire reaction mixture to about 9. Upon adding a small amount of an anionic polymer solution, a very dense and well formed floc of fast settling suspended solids was produced. The mixer was turned off and the reactor contents were allowed to settle by gravity on the solids. A clear, solids free supernatant liquid was produced in the upper section of the reaction tank which was sampled and tested for heavy metals before being decanted to the drain. Atomic absorption spectrophotometry analysis was unable to detect any copper, zinc or nickel in the supernatant liquid. Chromium was detected and measured at 0.015 Mg/L in the final effluent. As this result was well below the limit for publicly owned treatment waste permitted discharge, the effluent was compliantly discharged to the public sewer.

I claim:

1. The process for removing dissolved heavy metal from an aqueous solution containing said heavy metal which consists essentially of admixing said solution with a source of ferrous and dithionite ion in solution at a pH between about 1 and 7 to effect precipitation of between about 30 and 90 weight percent of said dissolved heavy metal and to form a first solution, admixing said first solution with an alkali metal hydroxide to effect precipitation of a remainder of said heavy metals including ferrous and ferric ions as metal hydroxides and recovering said precipitated heavy metal and metal hydroxides.

2. The process of claim 1 wherein the pH of said solution containing ferrous and dithionite ion is between about 3 and 6.

3. The process of claim 1 wherein said ferrous ion is produced in situ from iron particles.

4. The process of claim 1 wherein said ferrous ion source is ferrous dithionite.

5. The process of claim 1 wherein said ferrous ion source is ferrous sulfate.

6. The process of claim 1 wherein said ferrous ion source is ferrous bisulfite.

7. The process of claim 1 wherein said ferrous ion is ferrous sulfite.

8. The process of claim 1 wherein said dithionite ion is produced in-situ by reacting bisulfite ion and iron particles.

9. The process of claim 1 wherein said dithionite ion is produced in-situ by reacting bisulfite ion and zinc particles.

10. The process of claim 1 wherein said dithionite ion is produced in-situ by reacting bisulfite ion and aluminum particles.

11. The process of claim 1 wherein said dithionite ion is produced in-situ by reacting bisulfite ion and sodium borohydride.

12. The process of claim 1 wherein said dithionite ion source is sodium hydrosulfite.

13. The process of claim 1 wherein said dithionite ion source is zinc hydrosulfite.

14. The process of claim 1 wherein said dithionite ion source is aluminum hydrosulfite.

15. The process of claim 1 wherein said heavy metal is copper.

16. The process of claim 1 wherein said heavy metal is at least one metal selected from the group consisting of copper, tin, lead, nickel, chromium, cadmium, mercury, silver, gold, platinum and palladium.

17. The process of claim 3 wherein said iron particles are of a size between about −10 and +300 mesh.

18. The process of claim 8 wherein said source of bisulfite ion is an alkali metal meta-bisulfite.

19. The process of claim 8 wherein said source of bisulfite ion is an alkali metal sulfite.

20. The process of claim 8 wherein said source of bisulfite ion is sulfur dixoide in water.

21. The process of claim 8 wherein said source of bisulfite ion is sulfur dioxide with an alkali metal hydroxide.

* * * * *